United States Patent [19]

Jacobson

[11] 4,440,476
[45] Apr. 3, 1984

[54] OPTICAL DEVICE FOR AN INTENSIFIER TUBE

[76] Inventor: Andrew G. Jacobson, 851 Brookhurst, Dallas, Tex. 75218

[21] Appl. No.: 377,343

[22] Filed: May 12, 1982

[51] Int. Cl.³ .................... G02B 23/12; H01J 31/50
[52] U.S. Cl. .................................... 350/538; 350/1.2; 350/252; 250/213 VT
[58] Field of Search ............... 350/538, 252, 255, 1.2, 350/1.3, 1.4, 537, 561–566, 572, 575, 576, 577; 250/213 VT, 213 R

[56] References Cited

U.S. PATENT DOCUMENTS

| | | | |
|---|---|---|---|
| 1,130,468 | 3/1915 | Bierbrauer et al. | 350/563 |
| 1,640,694 | 8/1927 | Deming | 350/576 |
| 2,655,076 | 10/1953 | Armstrong | 350/563 |
| 2,834,889 | 5/1958 | Fries | 250/213 VT |
| 3,556,666 | 1/1971 | Lichtenstern | 350/566 |
| 3,737,667 | 6/1973 | Babb et al. | 350/538 |

*Primary Examiner*—Jon W. Henry
*Attorney, Agent, or Firm*—John F. Booth; Gerald G. Crutsinger; Monty L. Ross

[57] ABSTRACT

An optical device for an intensifier tube having an elongated housing with a cylindrical chamber extending therethrough, an intensifier tube in said chamber, first and second annular means in said chamber. Fastener means in said housing for releasably fixing said first and second annular means in selective axial position in said housing whereby the axial mounting position of the intensifier tube may be varied. Objective and eye piece optical means for projecting light to and receiving light from the intensifier tube.

Third and fourth annular means in said housing. The third annular means positioned in said chamber at one end of said housing, and the fourth annular means positioned in said chamber at the other end of said housing. The intensifier tube and said first and second annular means are positioned between said third and fourth annular means. Connector means on each of said third and fourth annular means for connecting to said objective and eye piece optical means. Fastener means in said housing for releasably fixing said third and fourth annular means in selective axial position in said housing whereby said eye piece and said objective means can be mounted extending from the ends of said housing and said eye piece means can be releasably mounted in a fixed position a relative distance from one end of said intensifier tube and the objective means can be releasably mounted in a fixed position a relative distance from the other end of said intensifier tube.

6 Claims, 4 Drawing Figures

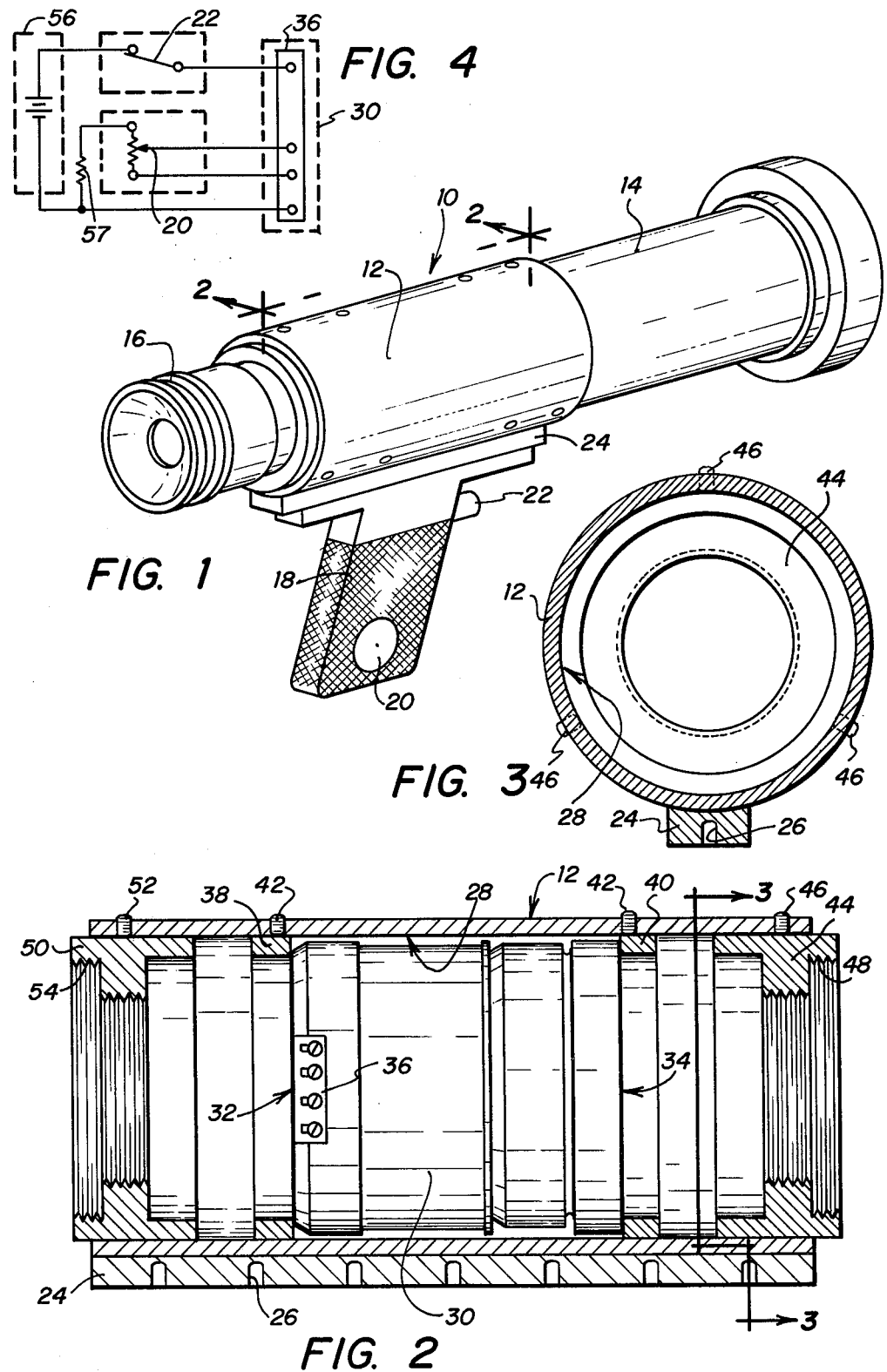

OPTICAL DEVICE FOR AN INTENSIFIER TUBE

TECHNICAL FIELD

The present invention relates to optical devices and more particularly to optical devices which utilize image intensifier tubes. Image intensifier tubes have been used for viewing at low light levels near the infrared regions of the spectrum. Direct or even remote viewing has been applied to many night observation devices and bore sighted scopes. Intensifiers are used for many purposes from astronomy applications to intelligence and surveillance applications. These devices do not require an artificial source of light. Intensifier tubes generally consist of an optic face plate on which the low level light image is incident. The low level image is transmitted from the faceplate by fiber optics to a photo multiplier where the image is amplified and transmitted onto an output screen or image plane. The spacing between the face plate and image plane varies from device to device due to differences in configuration and manufacturing tolerances. The integration of these intensifier tubes in an optical system utilizing an objective and eye piece require precise positioning of the objective and eye piece elements of the optical system with respect to the image plane and face plate, respectively.

DISCLOSURE OF THE INVENTION

The present invention relates to a optical device which utlizes an intensifier tube and complimentary optics. The device has a housing with a chamber formed therein and an intensifier tube mounted in the chamber. First and second positioning rings slide into the housing on the ends of the intensifier tube and a plurality of radially extending set screws releasably engage the rings to allow fixing the intensifier tubes in relative axial position within the chamber. Third and fourth rings are positioned within the chamber adjacent the ends thereof and each is provided with a coupling or connecting means, such as, universal threads for threaded engagement with threads on an eye piece and objective lens means. The objective lens and its respective ring are axially positioned within the chamber to focus the lens on the face plate of the intensifier. The plurality of axially extending set screws are provided in the housing to releaseably fix the ring carrying the objective lens in position focused on the face plate of the intensifier. In a likewise manner, the eye piece and its respective ring are axially positioned in the housing to focus on the image plane the intensifier tube. A plurality of set screws are provided to releasably fix the ring and eye piece in position. A mounting means is provided on the exterior of the housing for coupling the device to a tripod or the like. A power source such as a battery and control circuitry can be provided in the housing for the intensifier tube or the same may be externally mounted.

BRIEF DESCRIPTION OF THE DRAWINGS

Referring now to the drawings which should be viewed in conjunction with the description to disclose the present invention, it can be seen that:

FIG. 1 is a perspective view of the optical device of the present invention with an eye piece and objective lenses attached thereto and a handle means connected thereto;

FIG. 2 is a sectional view of the device taken along lines 2—2 of FIG. 1 illustrated without the objective and eye piece lenses or handle;

FIG. 3 is a section taken along lines 3—3 of FIG. 2; and

FIG. 4 is an illustrative circuit diagram for controlling the intensifier of the present invention.

DETAILED DESCRIPTION

Referring now to the drawings wherein like reference characters designate like or corresponding parts throughout the figures, there is illustrated in FIG. 1 an optical device which is generally designated by reference numeral 10. The optical device is of the type which utilizes an image intensifier means to enhance viewing in low-levels of light. The device 10 has a housing 12 and an objective and eye piece optic means 14 and 16, respectively, connected thereto. A handle 18 is likewise coupled to housing 12. In the device illustrated, the handle 18 has a compartment therein (not shown) which contains a battery power source as a potentiometer gain control 20 and an off-on switch 22 mounted therein.

The interior of the housing 12 is shown in FIGS. 2 and 3. As can be seen the housing 12 is generally cylindrical in shape, and has an elongated mounting flange 24 extending along the length thereof. The housing 12 can be manufactured from any suitable material which is lightweight and fairly rigid for maintaining optical tolerances and the flange 24 can be integrally formed, welded or suitably attached by any means known to mechanical arts. Flange 24 has a plurality of threaded mounted sockets 26 which can be utilized for attaching the housing to a tripod, rifle bore, or handle 18 (as shown in FIG. 1). The housing 12 is generally cylindrical in shape and has a cylindrical chamber 28 formed therein. An intensifier tube 30 is positioned within the chamber 28. The intensifier tube can be of any type or from various manufacturers such as the ones manufactured by Varo Electron Devices, Inc., 2203 W. Walnut St., Garland, Tex., Model No. 3603-1 or 3603-2. Intensifier tubes of the various manufacturers, for example, range in size from two to four inches in diameter and are one to nine inches in length. Intensifier tubes of this type do not require an artificial light source and amplify the existing light to allow viewing. Intensifier tube 30 has a face plate 32 and an image plane 34 on the ends thereof as shown. In operation, the intensifier tube 30 will amplify a light image received on face plate 32 and will project an amplified image onto image plane 34. A plurality of terminals 36 are provided on the intensifier tube 30 for providing power and controlling the operation of the intensifier tube.

Positioning of the intensifier tube within the housing is accomplished by use of a pair of annular members 38 and 40. These annular members 38 and 40 are of a size to slide within the chamber 28 and abut the ends of the intensifier tube 30 to hold the same in axial position. A plurality of socket head set screws 42 are provided in the walls housing to contact the annular members 38, 40 whereby the intensifier tube 30 can be fixed in the desired axial position to allow focusing of the objective and eye piece means on the face plate and image plate.

According to a feature of the present invention, an annular member 44 can be positioned in one end of the cylindrical chamber 28 of the housing 12 to support an eye piece optical device. The annular member 44 is of a size to slide axially into the cylindrical chamber 28 and a plurality of socket head set screws 46 are provided in the wall of the housing to lock the annular member 44 in the desired axial position. The member 44 can be provided with threads 48 or other types of mounting means for engagement with an eye piece lens. It is to be understood, of course, that a plurality of annular members 44 could be provided with different types of threads or connection means to allow connection of the member to a camera or other type of objective optical device. By providing the annular member 44 in a sliding engagement, the eye piece member can be focused on the image plane 34 by correctly axially positioning the two elements and locking the same in position.

In addition, an annular member 50 is provided for supporting an objective optical device. The annular member 50 is similar in construction to the member 44 and axially slides in the chamber 28. Set screws 52 are provided in the wall of the housing 12 to fix the annular member 50 into the desired axial position to allow focusing of the objective optical device on the face plate 32. The optical device of the present invention can provide a device which properly positions the various optical elements to focus on the face plate and image plane of the intensifier tube.

In FIG. 4, a schematic of the control circuitry of the intensifier tube 30 is shown. Intensifier tube 30 is Varo Model No. 3603-1 and is shown with its terminals 36 connected through an off-on switch 22 to a battery power source 56. A 470K resistor 56 is connected in series with a 50K potentiometer 20. Potentiometer 20 has its center and base leads connected to the terminal block 36. The off-on switch 22 provides power to the intensifier 30 while the potentiometer 20 allows adjustment of the gain as desired.

It is to be understood of course that the present invention has application to other types of intensifier optical devices such as rifle scopes, microscopes, telescopes and the like. Also, a plurality of objective and eye piece annular members could be provided with different types of engaging means such as are adapted to fit various makes and models of optical devices to provide a universal applicability of the device of the present invention. It is to be understood, of course, that other changes and modifications could be made in the device disclosed in this application without departing from the spirit and scope of the present invention as defined in the appended claims.

I claim:

1. An optical device for an intensifier tube comprising:

an elongated housing forming a cylindrical chamber extending therethrough, means for mounting an intensifier tube in said chamber comprising first and second annular means sized to mate in an axial sliding relationship with the walls of said chamber and fastener means in said housing for releasably fixing said first and second annular means in selective axial position in said housing whereby the axial mounting position of the intensifier tube may be varied, objective and eye piece optical means for projecting light to and receiving light from the intensifier tube, connector means on each of said eye piece and objective means, and third and fourth annular means sized to axially slide in said housing, said third annular means positioned in said chamber at one end of said housing, said fourth annular means positioned in said chamber at the other end of said housing whereby the intensifier tube and said first and second annular means will be positioned between said third and fourth annular means, connector means on each of said third and fourth annular means for releasable mating engagement with said connector means of said objective and eye piece optical means, and fastener means in said housing for releasably fixing said third and fourth annular means in selective axial position in said housing whereby said eye piece and said objective means can be mounted extending from the ends of said housing and said eye piece means can be releasably mounted in a fixed position a relative distance from one end of said intensifier tube and the objective means can be releasably mounted in a fixed position a relative distance from the other end of said intensifier tube.

2. The device of claim 1 wherein said connector means each comprise at least one radially extending threaded bore in the wall of said housing and at least one set screw in threaded engagement with said threaded bore.

3. The device of claim 1 wherein said third and fourth annular means are internally threaded for receiving said objective and eye piece means.

4. The device of claim 1 wherein said objective and eye piece means are lenses.

5. The device of claim 1 additionally comprising a mounting means on the exterior of said housing.

6. The device of claim 5 wherein said mounting means comprises a bar extending along the axial length of said housing and a plurality of threaded aligned bores therein for receiving threaded connectors.

* * * * *